May 15, 1951     J. M. TYLER ET AL     2,553,391
VIBRATION TESTING EQUIPMENT
Filed Dec. 1, 1945     2 Sheets-Sheet 2
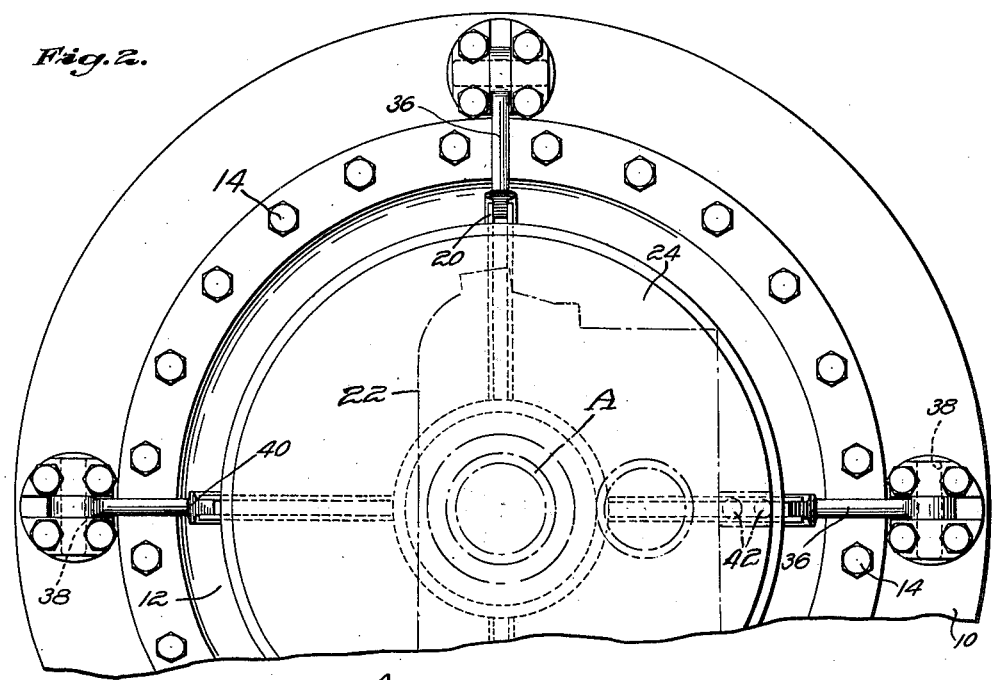
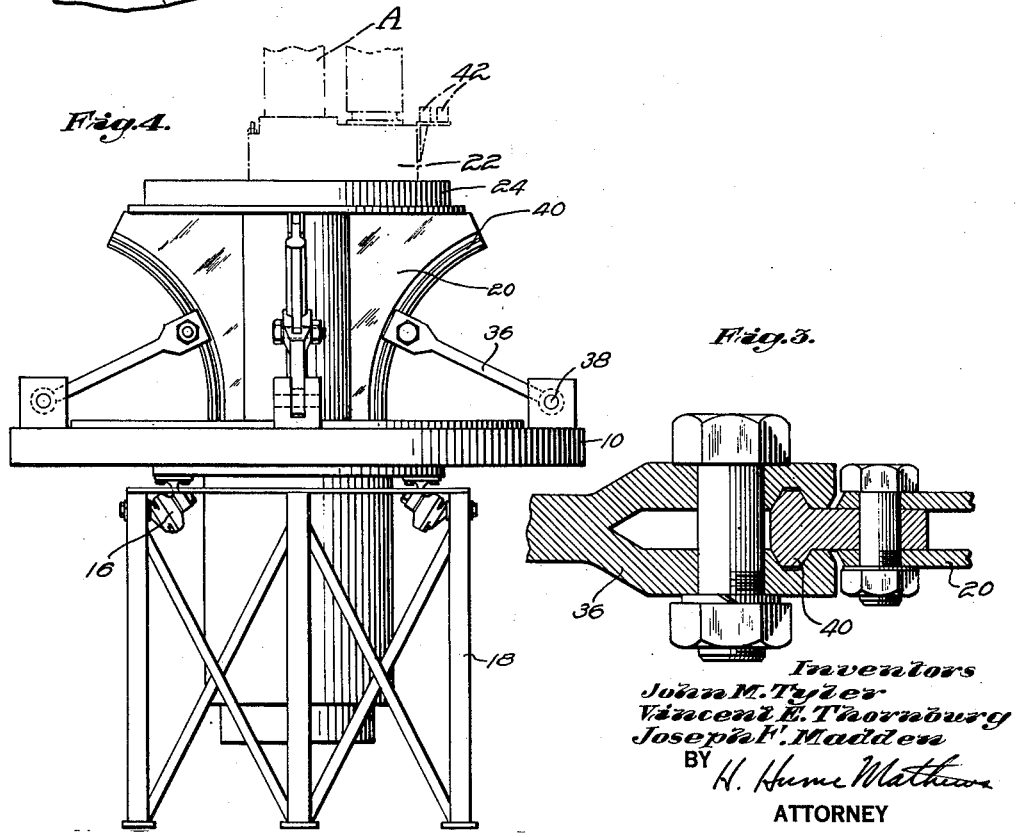
Inventors
John M. Tyler
Vincent E. Thornburg
Joseph F. Madden
BY
H. Hume Mathews
ATTORNEY Patented May 15, 1951

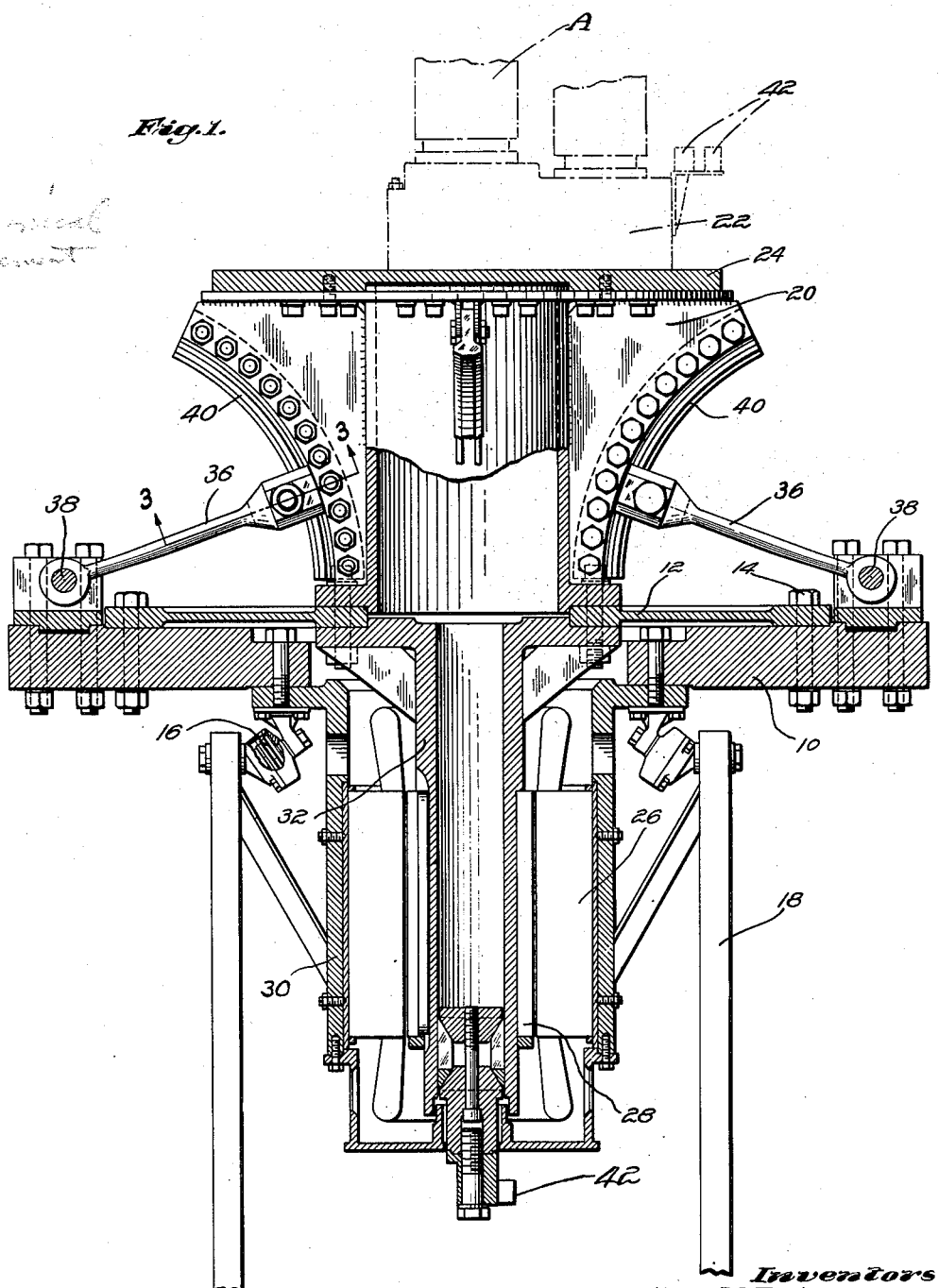

2,553,391

UNITED STATES PATENT OFFICE 2,553,391

VIBRATION TESTING EQUIPMENT

John M. Tyler and Vincent E. Thornburg, West Hartford, and Joseph F. Madden, East Hartford, Conn., assignors to United Aircraft Corporation, East Hartford, Conn., a corporation of Delaware Application December 1, 1945, Serial No. 632,138

11 Claims. (Cl. 73—67)

This invention relates to vibration testing equipment and particularly to a machine for testing the ability of aircraft accessories and their mountings to withstand vibrations of selected frequencies and amplitudes which are similar to the vibrations created by the engine-propeller combination of an aircraft.

An object of this invention is to provide improvements in vibration testing machines and particularly in machines for vibration testing aircraft engine accessories and their mountings.

A primary object of the invention is to provide means for subjecting an article and its support, such as an accessory mounted on an aircraft engine casing, to vibrations having characteristics corresponding to those to which such articles or accessories are subjected in normal use when mounted in position on an aircraft engine or other vibrating support.

Another object is to provide means to vibrate the accessory or other member or assembly being tested, at an adjustable frequency and an adjustable amplitude, so that the vibrations of the support on which the member is to be mounted may be simulated; these vibrations may correspond to the combined pitch and yaw vibrations, known as "whirl," of an aircraft engine-propeller system.

Other objects and advantages will be apparent from the specification and claims, and from the drawings which illustrate what is now considered to be a preferred embodiment of the invention.

In the drawings,

Fig. 1 is a side elevation partly in section showing the complete vibration testing machine.

Fig. 2 is a partial plan view of the parts shown in Fig. 1.

Fig. 3 is a detail sectional view taken on the plane of line 3—3 in Fig. 1, on an enlarged scale, and Fig. 4 is a complete outside view, on a reduced scale, of the vibration testing machine shown in the preceding figures.

In its preferred form, the invention may include the following principal parts: first, a large mass such as a large and heavy metal annulus flexibly mounted by several vibration isolators, or rubber mounts, on a frame supported by the floor; second, a resilient metal diaphragm attached at its outer periphery to the annulus; third, a structure attached to and flexibly supported by the inner periphery of the diaphragm; fourth, vibration producing means for imparting to the structure vibrations of variable frequency and amplitude; fifth, adjustable-stiffness elements or bracing arms extending between the annulus and the structure and adjustable to different angular positions to vary the natural frequency of the machine; and sixth, means for mounting the units or assemblies to be tested upon the structure.

Referring in detail to the drawing, a large heavy mass, such as the metal annulus 10, is supported horizontally on rubber mounts 16 by frame 18. Each mount 16 has an elastic material, such as rubber, disposed between opposed mounting parts or brackets which have projections attached respectively to the supporting frame 18 and to the annulus 10. These mounts, which may be similar to those shown and described in the patent to Tyler No. 2,317,500 granted April 27, 1943, support the machine on frame 18 in the same manner as an aircraft engine is supported by an airframe, or fuselage.

A flexible annular steel diaphragm 12 is attached to the mass 10 by a series of bolts 14 spaced around the outer periphery of the diaphragm. The inner periphery of the diaphragm is bolted to and flexibly supports a column or pedestal-like structure 20, to which the parts to be tested are secured.

Structure 20 extends upwardly from the plane of the diaphragm and on its upper horizontal surface has a bed or plate 24 to which the unit or assembly being tested is bolted. In the illustrated form of the invention, the broken lines (Figs. 1, 2 and 4) show an assembly to be tested comprising a radial aircraft engine rear case 22 and an accessory A, such as a starter or generator, mounted thereon. Case 22 is bolted to plate 24 during the test; the accessory is mounted on the case in the normal manner.

While diaphragm 12 prevents radial motion of the structure 20 (with respect to an axis normal to the plane of the diaphragm) it allows "whirl" of the support to duplicate engine propeller vibrations.

Vibration of the structure 20, and consequently of the test assembly 22 and A, is effected by a "shake" motor, which has a field 26 supported by and movable with the mass 10 and an armature 28 supported by and movable with the inner periphery of diaphragm 12. Field 26 and armature 28 are fixed relative to the outer and inner edges, respectively, of the diaphragm; therefore they cannot relatively rotate. However, the flexibility of the steel diaphragm 12 enables the armature 28 to vibrate relative to the field 26 and the mass 10.

Field 26 comprises two sets of windings, one set being excited by D. C. current, and the other set by an A. C. current of variable frequency. The latter current may be conveniently obtained from an alternator driven by a variable speed motor. As shown in Fig. 1 of the drawings, the windings of the field 26 are mounted within a housing or sleeve 30 having a flange at its upper end fixed to the mass 10. Armature 28 is fixed on a shaft 32 having an upper flanged end which is bolted to the structure 20; the inner edge of diaphragm 12 is clamped between the upper flange on shaft 32 and the structure 20. The armature and the field of the shaking motor are so constructed and arranged (in a known manner which, per se, constitutes no part of the present invention) as to produce upon excitation of the field windings a rotating lateral force between the armature and the field; the torque of the motor is substantially zero.

The rotating lateral force on the armature causes a whirling vibratory motion of the structure 20 about a node on the axis of structure 20 and shaft 32. In the embodiment of the invention illustrated in the drawing this node, about which the axis of shaft 32 and structure 20 whirls, is normally located in or near the plane of diaphragm 12. However, when an accessory installation is being vibrated at or near resonance, the mass and vibration characteristics of the accessory installation may cause the node to shift along the axis of shaft 32 and structure 20. The position of the node may be adjusted to some degree by varying the mass of plate 24 and/or by varying the angular position of arms 36 hereinafter described. The frequency of this vibratory motion is determined by the excitation frequency, or the frequency of the voltage applied to the A. C. field winding, and determines the frequency of the vibrations to which the test piece is subjected. The amplitude of vibration of the machine is adjusted by varying the magnitude of the alternating and direct field currents in the shaker motor.

While a particular shaking means, or "shaker motor," has been described above it is to be understood that the present invention does not rely on and is not limited to any specific shaker motor; any shaking means which produces a rotating lateral force may be used, such as a rotating unbalanced mass or other known device.

To produce amplitudes of accessory vibrations as large or larger than those encountered in aircraft power plant installations, or other vibrating system to be simulated, there are provided adjustable-stiffness regulating elements or arms 36 between the structure 20 and the mass 10. By varying the angular disposition of these elements 36, the natural frequency of vibration of the machine can be adjusted to any desired frequency in the range of frequencies to be studied. By so "tuning" the machine to be at or near resonance with the excitation frequency (which in turn may be adjusted to a selected frequency) the power requirement to operate the machine may be kept at a minimum and the amplitudes of vibration of structure 20 may be greatly increased.

The adjutable stiffness elements 36 are in the form of radially disposed arms. One end of each arm is pivotally attached as shown at 38 to the annulus 10 adjacent its outer periphery and the other end of each arm is clamped (see Fig. 3) in a selected angular position to a circular track or web 40 which is fixed to the structure 20. Four such arms in all are provided. When the arms are adjusted and clamped substantially horizontally and lie parallel to the plane of the diaphragm 12, they add relatively little stiffness to that of the diaphragm structure itself, and the natural frequency of the system in "whirl" is dependent mainly on the bending stiffness of the diaphragm 12. When clamped in the angular positions shown in full lines in Fig. 1, the arms 36 materially increase the rigidity or stiffness of the structure and increase the natural frequency of vibration of the machine.

Thus by raising the arms to increase the angles between the arms and the plane of the diaphragm the natural frequency of the machine may be raised and by lowering the arms the natural frequency may be lowered. For some installations the machine may be designed so as to be adjustable to frequencies in the range between 5,000 cycles per minute and 12,000 cycles per minute. However, the upper limit can be increased merely by providing a heavier set of arms 36 and the lower limit decreased by providing a lighter diaphragm 12.

A preferred procedure for vibration testing a part such as an aircraft engine accessory with the machine described herein comprises; (1) securing the engine casing with the accessory mounted thereon to the plate 24, (2) adjusting the frequency of vibrations imparted by the shake motor to the accessory installation being tested (by changing the excitation frequency) to approximately that of a natural frequency of the accessory installation, (3) adjusting the amplitude of the vibrations imparted to structure 20, plate 24 and the accessory installation (by changing the excitation current and/or adjusting arms 36) until it equals or exceeds those of a similar accessory when mounted in a standard aircraft installation, (4) running the test under these extreme conditions of vibration for a predetermined number of cycles of vibration or until failure of the accessory or its fastenings occurs.

To indicate the vibration characteristics of the part or assembly being subjected to test, vibration pickups 42 may be provided. These pickups may be of the type disclosed and claimed in the co-pending application of Tyler and Thornburg application Serial No. 653,898, filed March 12, 1946, now Patent No. 2,443,969, issued June 22, 1948, assigned to applicants' assignee. As they do not constitute a part of the present invention they need not be further described here; a vibration analyser or indicator of any conventional type may be used, though preferably the pickups and their associated electrical circuits should be constructed and arranged to indicate vibrations along mutually perpendicular axes normal to the axis of shaft 32 and structure 20.

It is to be understood that the invention is not limited to the specific embodiment herein illustrated and described, but may be used in other ways without departure from the spirit of the invention as defined by the following claims.

We claim:

1. A device for vibration testing of accessories comprising a large mass, a support for said accessories, a flexible supporting means connecting said support to said mass, vibration producing means interconnecting said mass and support to vibrate said support and the accessory being tested, and adjustable stiffness varying means including radially disposed arms connecting said mass and said support.

2. A device for vibration testing of articles comprising a large mass, a structure for supporting an article to be tested, a diaphragm attached to and supported by said mass, said diaphragm being connected to and flexibly supporting said structure thereon, vibration producing means to apply forces to said structure in planes spaced and substantially parallel to said diaphragm, and means to vary the stiffness of said flexible support for said structure including radially disposed arms connected to said mass and said support.

3. In a vibration testing machine, a diaphragm of resilient material having an opening in the central portion thereof, a supporting ring engaging with and supporting said diaphragm adjacent its outer edge, a structure for vibrating an article to be tested mounted on said diaphragm adjacent said opening and positioned transversely to the plane of said diaphragm, means for securing said structure to said diaphragm adjacent said opening, means for securing an article to be tested to said structure on one side of said diaphragm and at a point spaced from the plane thereof, and means for applying to said structure a lateral force, rotating about an axis substantially perpendicular to the diaphragm and acting on said structure at a point spaced from the plane of said diaphragm.

4. A machine according to claim 3, including a supporting frame for the ring, and elastic means for securing said supporting ring to the supporting frame.

5. A machine according to claim 3, including an annular mass fixed to said diaphragm adjacent the outer edge thereof, a plurality of arms each having one end pivoted to said mass, and means for securing the other ends of said arms to said structure in different angular positions relative to the plane of said diaphragm.

6. In a vibration testing machine, a diaphragm of resilient material having an opening in the central portion thereof, a structure for vibrating an article to be tested extending through said opening transversely to the plane of said diaphragm, means for securing said structure to said diaphragm adjacent said opening, means for securing an article to be tested to said structure on one side of said diaphragm, means for applying a rotating lateral force to said structure on the other side of said diaphragm, an annular mass fixed to said diaphragm adjacent the outer edge thereof, a plurality of arms, each having one end pivoted to said mass, and means for securing the other ends of said arms to said structure in definite angular positions relative to the plane of said diaphragm.

7. A device for vibration testing of articles comprising a large mass, a structure adapted to have mounted thereon an article to be tested, a flexible diaphragm attached at its periphery to and supported by said mass said structure being centrally secured to and supported by said diaphragm, means to effect whirling vibrations of said structure about a pivotal point located on the longitudinal axis of said structure, said vibrations being produced at variable frequencies and amplitudes, adjustable radially disposed arms connecting said mass to said structure at points spaced from the diaphragm, and a vibration measuring device supported by said structure.

8. A device for vibration testing of articles comprising a large mass, a structure for supporting an article to be tested, a diaphragm attached to and supported by said mass, said diaphragm being connected to and flexibly supporting said structure on said mass, vibration producing means to apply forces to said structure in planes spaced and substantially parallel to said diaphragm, and angularly adjustable arms connecting said mass and said structure.

9. A device for vibration testing aircraft engine accessory installations comprising a large mass, a structure for supporting an accessory installation, flexible supporting means connecting said structure and mass by which said structure is non-rotatably and flexibly supported on said mass, vibration producing means to effect whirling vibratory movements of said structure about a point on an axis passing through the plane of the supporting means, and adjustable connections between the mass and structure for varying the natural frequency of vibration of said structure.

10. In a vibration testing machine, a resilient diaphragm, a relatively large mass fixed to the outer periphery of said diaphragm, a relatively small mass fixed to the central portion of and supported by said diaphragm, means for mounting a part to be tested on said relatively small mass at a point spaced from the plane of said diaphragm, and a rotating force means supported adjacent said small mass and cooperating therewith for causing said small mass to vibrate in such a way that an axis fixed in said small mass passing through the center of and in a direction perpendicular to said diaphragm describes a conical surface.

11. A machine according to claim 10, including adjustable connections between the large mass and small mass for adjusting the natural frequency of vibration of said small mass.

JOHN M. TYLER.
VINCENT E. THORNBURG.
JOSEPH F. MADDEN.

REFERENCES CITED

The following references are of record in the file of this patent:

UNITED STATES PATENTS

| Number | Name | Date |
|---|---|---|
| 2,278,241 | Case | Mar. 31, 1942 |
| 2,412,860 | Baudry | Dec. 17, 1946 |